Patented Feb. 21, 1939

2,147,785

UNITED STATES PATENT OFFICE 2,147,785

PROCESS OF FORMING SULPHURIC ACID ESTERS

Martin Eli Cupery and Joseph Harrel Shipp, Wilmington, Del., assignors to E. I. du Pont de Nemours & Company, Wilmington, Del., a corporation of Delaware No Drawing. Application September 21, 1937, Serial No. 164,986

9 Claims. (Cl. 260—400)

This invention relates to an improved process for the preparation of sulphuric acid esters of various aliphatic organic compounds containing hydroxyl groups and/or olefin linkages by means of sulphuric acid containing an amide of a carboxylic acid having less than seven carbon atoms. A preferred embodiment of the invention is exemplified by the sulphation of an unsaturated primary alcohol with sulphuric acid containing dissolved urea. The products obtainable by this reaction have properties that render them valuable as textile assistants, in particular, as softening agents for textile fibres and goods made therefrom.

It has long been known that compounds containing alcoholic groups and/or olefin linkages can be converted into sulphuric acid esters by simple reaction with sulphuric acid. Further, it is known that the process may be improved and the properties of the product altered by the addition of certain modifying agents to the sulfating mixture and by varying the temperature and other conditions. The present invention constitutes a further advancement over this known prior art in particulars pointed out in later paragraphs of the description which follows.

When sulphuric acid is reacted with aliphatic alcohols or olefins to form sulphate esters, there may be formed also to some extent compounds of the sulphonic acid type. The term "sulphonation of oils" is used rather broadly in both the patent and journal literature and in general refers to the production of sulphate esters, i. e., a sulphation reaction, and not true sulphonation. Since in the sulphation of oils a slight degree of sulphonation may also occur, the term sulphation used herein should be read with that understanding in mind.

Sulphation reactions must be carefully controlled in accordance with the nature of the starting material. Frequently the reaction with ordinary sulphuric acid is exceedingly vigorous, so much so that it is common practice to add an inert solvent and cool the solution in order to keep the reaction under control. Such a procedure involves the difficulty of solvent removal following completion of the reaction and the maintenance of a low temperature during the reaction. In some cases low temperature, without addition of a solvent, is employed. These methods, however, cause slow rate of reaction and, in the case of fats and fatty oils, lead to serious inconveniences due to increase in viscosity and even solidification of the reacting compounds.

This invention contemplates broadly the provision of a new and useful sulphating process in which sulphuric acid, modified in its action through addition of urea or related materials, is employed for preparation of superior products of the sulphate ester type. A further particular object is to provide a method of preparing more completely sulphated products and more uniformly sulphated products than have hitherto been possible by known procedures. Other objects and advantages of the invention will be pointed out in the following description or will be apparent from such description.

These objects are accomplished by the following described procedure in which sulphuric acid containing dissolved urea or chemically related compounds is reacted with aliphatic compounds containing hydroxyl groups and/or unsaturated linkages to form derivatives of the sulphate ester type.

It has been discovered that highly improved textile assistants, softening agents in particular, may be prepared by reacting certain oils, fats, and higher long chain alcohols and olefins (containing not less than 8 carbon atoms in the aliphatic chain), with solutions of urea or closely comparable reagents in sulphuric acid. The reaction with urea-sulphuric acid may be carried out at ordinary or even slightly elevated temperatures (30–40° C.) without the production of inferior products.

The concentration of the modifying agent depends on several factors, chiefly the agent being used and the material being sulphated. In the case of urea itself, the optimum concentration is of the order of 20 parts urea to 100 parts concentrated sulphuric acid. It is to be understood, however, that the concentration may be widely varied and still give satisfactory results. Concentrations varying between 5 and 30 parts of urea per 100 parts acid may be employed, depending upon the material being sulphated. Roughly, the same concentrations hold good for other like modifying agents referred to herein as amides of carboxylic acids containing less than seven carbon atoms.

In regard to the concentration of sulphuric acid to be used: the preferred range is 93 to 98 per cent, but for certain materials acids as low as 80 percent and as high as 100 per cent are desirable.

Experiments show that alcohols and olefins having eight or more carbon atoms in the chain are necessary to furnish sulphated derivatives of practical usefulness as wetting agents and detergents.

In some cases materials prepared with urea-sulphuric acid reagent by the processes of this invention, for example those prepared from castor oil, are superior as textile finishing agents, to products prepared by previously known methods designed to insure higher degrees of sulphation. The sulphation of technical oleyl alcohol ("Ocenol") by means of urea-sulphuric acid and like modified sulphuric acid gave from 80 to 85 per cent sulphation while ordinary sulphuric acid gave only from 65 to 75 per cent sulphation under the same conditions. Increased sulphation very likely accounts for the superior softening action obtained with applicants' products on textile yarns.

The sulphate esters may be analyzed for sulphate ester content by the method described by Hart in the J. Ind. Eng. Chem. 9, 851 (1917), or by other known methods. Tests which demonstrate superior quality of products prepared by means of the urea-sulphuric acid reagent are described in detail in the examples given below.

As shown in the examples long chain alcohols and various oils and fats which contain unsaturated linkages and/or hydroxyl groups are suitable materials for sulphation by this process.

The following examples, in which the parts are by weight are intended to further clarify specific features of the invention and are not to be construed as limiting the scope thereof.

*Example I*

To 400 parts by weight of castor oil was added during one hour, with stirring, a solution of 33 parts of urea dissolved in 167 parts of 96 per cent sulphuric acid. A cooling bath was applied externally to the reaction mixture so that the temperature could be maintained at about 25–30° C. The mixture was stirred for an additional three hours at room temperature and then allowed to stand for about 18 hours. The resulting product was washed twice with 1600 parts of 11 per cent sodium suphate solution, and the mixture allowed to stand for about 15 hours following each washing to insure relatively complete separation of the aqueous layer from the treated oil. The oil fraction was separated and then treated with 20 per cent sodium hydroxide solution until it showed a slight alkaline reaction to litmus. The final product contained about 50 per cent total fatty matter and was entirely soluble in water. Such solutions showed the usual wetting, foaming and emulsifying properties of sulphated oils. The sulphated oil present in the product contained about 9.27 per cent combined sulphur trioxide and had an iodine number of 80.4.

The softening action of the above product on viscose rayon yarn was tested by the following procedure: an 8 gram skein of bleached, unfinished, viscose rayon yarn was placed in a solution containing 1 gram of the above product per liter of distilled water. The skein was turned several times during a period of five minutes while the solution was maintained at 50° C. It was then removed, immediately centrifuged under standard conditions, and dried at 100° C. for 10–15 minutes. The skein was then allowed to condition in air for 3–5 hours, after which it was compared with control samples for softness. The above product was compared with a high grade commercial "sulphonated" castor oil prepared by means of ordinary sulphuric acid (without the presence of urea) and was found to be greatly superior to the latter in its softening action on an equal weight basis. The commercial product (containing about 35 per cent fatty matter) was approximately equal in softening effect at a concentration of 2.8 grams per liter compared to the above product (containing about 50 per cent fatty matter) prepared by means of urea-sulphuric acid reagent, at a concentration of only 1.0 gram per liter. Hence, on the basis of fatty matter content the product prepared by means of urea-sulphuric acid reagent is about twice as effective as the product obtained from an ordinary sulphation reaction. At a concentration of 2.0 grams per liter the product obtained from urea-sulphuric acid showed even better softening effect while the product obtained by sulphation with ordinary sulphuric acid (see above) showed no increased softening even at 4.2 grams per liter concentration. Evaluations of textile softeners are readily made by anyone experienced in the art of evaluating textile fabrics. To anyone skilled in this art it was easily seen that the above product sulphated with urea-sulphuric acid reagent was definitely superior as a softening agent, on an equal weight basis, to products sulphated with ordinary sulphuric acid.

*Example II*

To 200 parts by weight of mixed saturated and unsaturated aliphatic alcohols obtained by carboxyl hydrogenation of sperm oil comprising straight and branched chains of 10 to 20 carbon atoms, and having an iodine number of about 65 and a hydroxyl number of about 226, was added a solution of 40 parts urea in 200 parts of 98 per cent sulphuric acid. The acid was added during a period of 2 hours while the temperature was maintained at 35–40° C. After stirring for an additional 15 minutes, the mixture was slowly poured into 265 parts by weight of 50 per cent aqueous sodium hydroxide solution containing 225 parts of ice, and the temperature then allowed to increase to slightly over 100° C. for a short period. The product was well stirred and cooled, forming a buff colored paste which was entirely soluble in water. The final product (containing 21.5 per cent fatty material), when tested as a softening agent for viscose rayon as described in Example I, gave definitely better softening action at 0.6 gram per liter than sodium cetyl sulphate, which is frequently employed as a textile finishing (softening) agent (containing 17 to 18 per cent fatty material) at 1 gram per liter. The product showed excellent wetting and emulsifying properties as well as a high resistance toward precipitation by calcium or magnesium salts. For example, a solution containing 100 parts per million of calcium chloride and 2.5 grams (0.53 gram active material) per liter of the above product, showed slight precipitation below 30° C., was cloudy at 30–33° C., and became clear on warming to 58–60° C. A similar solution containing 100 p. p. m. calcium chloride and 2.9 grams (0.52 gram active material) per liter of sodium cetyl sulphate (17–18 per cent fatty matter) gave precipitation below 65° C., but was cloudy at 65–67° C. and became clear at 85–87° C. Hence, the above product prepared with urea-sulphuric acid is greatly superior to sodium cetyl sulphate for use in hard water solutions.

Analysis of sulphated products such as the above prepared by means of urea-sulphuric acid showed that about 85 per cent of the aliphatic alcohol starting material was sulphated, while similar products prepared from the same material under analogous conditions but using unmodified 100 per cent sulphuric acid, showed only about 74 per cent sulphation.

In place of urea in the foregoing example, other modifying agents chemically related to urea may be substituted. Similar, although somewhat less effective products were obtained when in place of urea is the above example the following materials were added to sulphuric acid: formamide, acetamide, or benzamide. The products were distinctly superior with respect to solubility in hard water and improved softening action on rayon yarn when compared with similar product prepared under identical conditions but using ordinary, unmodified sulphuric acid as the sulphating reagent.

Example III

To 300 parts by weight of 99 per cent sulphuric acid was added 60 parts of urea, keeping the temperature at 25 to 40° C. This was then added slowly during two hours, with rapid stirring to 300 parts by weight of technical 9,10-octadecenyl alcohol derived from the hydrogenation of sperm oil, keeping the temperature of the reaction mixture at 30–40° C. After all of the acid reagent had been added the mixture was stirred for 10 minutes and then slowly poured with stirring into 1400 parts by weight of ice water containing 195 parts of dissolved sodium hydroxide. The product obtained was a pale, tan colored paste which was slightly alkaline to phenolphthalein. The product was stable upon prolonged standing, showed good wetting, detergent, and emulsifying properties, and good resistance toward precipitation by lime salts. At a concentration of 1 gram per liter of water the above product, containing 13 per cent fatty material, was equal in its softening action on viscose rayon to 9,10-octadecenyl alcohol at the same concentration sulphonated by ordinary procedures (using unmodified sulphuric acid), but containing 45 per cent fatty material. Hence, the product prepared by the process described above was about 3.5 times as effective as a textile softening agent on the basis of equivalent amounts of fatty material as a sulphated product made in the usual way. Superior products were likewise obtained when the above described process was used for the sulphation of ricinoleyl alcohol, technical 9,10-octadecenyl alcohol acetate, or the mixed fatty alcohols derived from the hydrogenation of rapeseed oil.

Example IV

To 200 parts by weight of the mixed saturated and unsaturated aliphatic alcohols comprising straight and branched chains of 12 to 20 carbon atoms derived from the carboxyl hydrogenation of marine animal oils and having an iodine number of 81.8, and a hydroxyl number of 204, was added slowly a solution of 40 parts of urea in 200 parts of 98 per cent sulphuric acid. The urea-acid reagent was added during a period of two hours while the temperature was held at 40–45° C. When all of the acid solution was added the mixture was stirred for about ten minutes and then poured slowly into a neutralizing solution comprising 390 parts by weight of water, 472 parts ice, and 367 parts of 35 per cent sodium hydroxide. The product obtained had a paste-like consistency, a pale yellowish color, and reacted faintly alkaline to phenolphthalein.

When this product was again hydrolyzed the recovered alcohol had an iodine number of 50 and a hydroxyl number of 259. The above sulphated product was greatly superior as a textile softening agent to the product obtained under identical conditions, excepting that sulphuric acid without the addition of urea was used. The textile softening tests were made at 1.6 grams product (equivalent to 0.19 gram fatty matter) per liter of water, in each case, as described in Example I. In addition, the product showed excellent wetting and emulsifying properties as well as exceptional resistance toward precipitation by calcium salts and magnesium salts, such as are present in hard water.

An analysis of the product prepared by means of urea-sulphuric acid indicated that approximately 83 per cent of the fatty alcohol starting material had been sulphated, while the product obtained by means of ordinary 98 per cent sulphuric acid showed only about 66 per cent sulphation. Hence, more completely sulphated products are obtained by means of urea-sulphuric acid. Either an increase or a decrease in the proportion of urea employed as described above gave somewhat inferior results; for example, when in place of 40 parts urea in the above example only 20 parts of urea were employed, the final product showed 76 per cent sulphation, or, when 60 parts urea were used in the above example, the final product, likewise, showed about 76 per cent sulphation.

Example V

A solution comprising 20 parts urea dissolved in 100 parts by weight of 100 per cent sulphuric acid was slowly added with stirring to 100 parts of isopropyl oleate, keeping the temperature at 5–10° C. When all of the acid reagent was added (requiring 1½ hours), the mixture was stirred for an additional 15 minutes and then poured into a neutralizing mixture comprising 70 parts sodium hydroxide, 370 parts water and 300 parts crushed ice. The yellow oily layer which separated was decanted and purified by extraction with petroleum ether. The residual product was completely soluble in water. Such solutions showed excellent foaming, emulsifying and wetting properties. For example, when the product was tested as a wetting agent by the method described in the American Dyestuffs Reporter (20, 201 (1931)), 0.35 gram of active ingredient per liter of water gave sinking in 25 seconds. In the same type of test, high-grade commercial wetting agents require a concentration of approximately 1 to 3 grams of active ingredient per liter to give sinking in 25 seconds.

Similar products were obtained when the above procedure was used for the sulphation of isobutyl oleate, methyl oleate, oleic acid, technical oleyl acetate, beta-methoxyethyl oleate, or the methyl esters of the mixed rapeseed oil acids. In all cases products of improved color were also obtained.

In place of castor oil described in a foregoing example one may sulphate by this process other oils, fats or oleaginous materials which contain unsaturated linkages and/or hydroxyl groups, such as olive oil, corn oil, neat's-foot oil, cottonseed oil, rapeseed oil, linseed oil, menhaden oil, soya bean oil, cod oil, peanut oil, whale oil, and the like. Also a mixture of two or more oils, fats, etc., may be sulphated with urea-sulphuric acid, for example, a mixture of olive oil and castor oil, etc.

In place of technical 9,10-octadecenyl alcohol described in the foregoing examples, other saturated or unsaturated alcohols may be used, for example, octyl alcohol, dodecyl alcohol, tetradecyl alcohol, cetyl alcohol, octadecyl alcohol, abietyl alcohol or the mixed primary and secondary aliphatic branched chain alcohols containing 8 to 15 carbon atoms such as are obtained as a by-product in the hydrogenation of carbon oxides, or the mixed alcohols obtained by the catalytic or sodium reduction of animal and vegetable oils and fats, for example, eleostearyl alcohol derived from the reduction of Chinawood oil acids, ricinoleyl alcohol derived from the reduction of castor oil acids and the like, such as are described in U. S. Patent 2,019,022.

Other long chain compounds containing hydroxyl groups may be sulphated by means of urea-sulphuric acid, for example, polyglycol, or such derivatives of polyglycol as contain at least one free hydroxyl group, or the ethanol amines of long chain fatty acids, or similar derivatives.

The modifying reagents may in certain cases be added to the material which is being sulphated prior to the addition of sulphuric acid. In such cases the same modifying effect will be obtained as when the modifying agent is dissolved in the sulphuric acid prior to the sulphation reaction.

Although it has been pointed out that products of this invention are valuable as textile softening agents, it is not desired to give the impression that all products obtainable are desirable for that purpose. Certain of the products are more useful as leather finishing agents, detergents, wetting agents, emulsifying agents, foaming agents, etc.

The addition of urea and related agents to sulphuric acid serves to control the sulphation reaction with aliphatic compounds containing reactive groups, such as a hydroxyl group and/or an olefin linkage. Hence, only a minor degree of temperature control, etc., is required for such reactions. Less oxidation occurs with urea-sulphuric acid than with ordinary sulphuric acid, thereby frequently causing less discoloration; for example, the sulphation of castor oil is accomplished with less oxidation and discoloration when urea or similar modifying compounds are added to the sulphuric acid reagent.

In the production of textile finishing (softening) agents of the sulphate ester type, it is desirable to prepare uniformly reacted products which show high solubility even in dilute acid solutions and which contain no ingredients or by-products such as are readily precipitated by calcium or magnesium salts or other salts present in hard water. In order to obtain such products, it has been considered essential to prepare derivatives containing a maximum degree of sulphation. The prior art procedures may accomplish this by low temperature reactions ($-5$ to $+5°$ C.), or by employing excessive amounts of reagent. Such procedures are inconvenient and expensive and under the best conditions yield only mediocre products. In the foregoing examples we have shown the superior quality of products prepared with urea-sulphuric acid and similar reagents, as textile assistants, and softening agents.

There are certain known sulphating procedures that involve an alteration of the reactivity of the sulphuric acid reagent by the addition of compounds such as potassium acid sulphate, acetic acid, alcohols, glycerine, ethyl acetate, ether, and the like (for sulphation of fatty oils, etc.). These procedures are effective to some extent but are objectionable in many instances where cost, odor, recovery, fire hazard, health hazard, and quality of the product are considered. In some cases an increased hydrolysis of the ester groups present in oils, fats, etc. is apparently caused by modifying the sulphuric acid reagent through the addition of certain agents which increase the hydrogen ion activity of the acid. This may bring about the formation of objectionable free fatty acids in the products or cause a low degree of sulfation because the sulphate esters which were formed by the reaction are again rapidly hydrolyzed. Such difficulties and inconveniences are largely eliminated by the use of urea-sulphuric acid and similar reagents.

As many apparently widely different embodiments of this invention may be made without departing from the spirit and scope thereof we do not limit ourselves to the specific embodiments thereof except as defined in the appended claims.

We claim:

1. The process of forming sulphuric acid esters which comprises reacting a sulphuric acid solution of an amide of a carboxylic acid containing less than seven carbon atoms with a member of the group consisting of saturated aliphatic alcohols and other aliphatic compounds containing olefin linkages, said aliphatic alcohols and other compounds having not less than eight carbon atoms chain length.

2. The process of forming sulphuric acid esters which comprises reacting a sulphuric acid solution of an amide of a carboxylic acid containing less than seven carbon atoms with a member of the group consisting of saturated aliphatic alcohols and other aliphatic compounds containing olefin linkages, said aliphatic alcohols and other compounds having twelve to twenty carbon atoms chain length.

3. The process of forming sulphuric acid esters which comprises reacting a sulphuric acid solution of an amide of a carboxylic acid containing less than seven carbon atoms with members of the group consisting of saturated aliphatic alcohols, unsaturated aliphatic alcohols and other aliphatic compounds containing olefin linkages, said aliphatic compounds having not less than eight carbon atoms chain length, and being reacted in the form of vegetable and animal fats and oils.

4. The process of forming sulphuric acid esters which comprises reacting a solution of urea in sulphuric acid with a member of the group consisting of saturated aliphatic alcohols, unsaturated aliphatic alcohols and other aliphatic compounds containing olefin linkages, said aliphatic alcohols and other compounds having not less than eight carbon atoms chain length.

5. The process of forming sulphuric acid esters which comprises reacting a solution of urea in sulfuric acid with a member of the group consisting of saturated aliphatic alcohols, unsaturated aliphatic alcohols, and other aliphatic compounds containing olefin linkages, said aliphatic alcohols and other compounds having twelve to twenty carbon atoms chain length.

6. The process of forming sulphuric acid esters which comprises reacting a solution of urea in sulphuric acid with members of the group consisting of saturated aliphatic alcohols, unsaturated aliphatic alcohols and other aliphatic compounds containing olefin linkages, said aliphatic compounds having not less than eight carbon atoms chain length, and being reacted in the form of animal fats and oils.

7. The process of forming sulphuric acid esters which comprises reacting a solution of urea in sulphuric acid with castor oil.

8. The process of forming sulphuric acid esters which comprises reacting a solution of urea in sulphuric acid with mixed aliphatic alcohols obtained by carboxyl hydrogenation of sperm oil.

9. The process of forming sulphuric acid esters which comprises reacting a solution of urea in sulphuric acid with isopropyl oleate.

MARTIN ELI CUPERY.
JOSEPH HARREL SHIPP.